(12) United States Patent
Mukherjee

(10) Patent No.: US 9,996,867 B2
(45) Date of Patent: Jun. 12, 2018

(54) LOCAL MERCHANT RECOMMENDATION ENGINE

(71) Applicant: Go Daddy Operating Company, LLC, Scottsdale, AZ (US)

(72) Inventor: Rajatish Mukherjee, Sunnyvale, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 830 days.

(21) Appl. No.: 14/453,860

(22) Filed: Aug. 7, 2014

(65) Prior Publication Data

US 2016/0042425 A1    Feb. 11, 2016

(51) Int. Cl.
   *G06Q 30/00*   (2012.01)
   *G06Q 30/06*   (2012.01)
   *G06F 17/30*   (2006.01)

(52) U.S. Cl.
   CPC ... *G06Q 30/0625* (2013.01); *G06F 17/30864* (2013.01); *G06Q 30/0619* (2013.01)

(58) Field of Classification Search
   CPC .......... G06Q 30/06; G06Q 30/0601–30/0643; G06Q 30/08; G06F 17/30286; G06F 17/30312; G06F 17/30289; G06F 17/30864; G06F 17/2247
   See application file for complete search history.

(56) References Cited

U.S. PATENT DOCUMENTS

| | | | |
|---|---|---|---|
| 6,601,057 B1 | 7/2003 | Underwood et al. | |
| 7,062,492 B1 | 6/2006 | Graham | |
| 7,143,048 B1 | 11/2006 | Ruben et al. | |
| 7,500,182 B2 | 3/2009 | Kelly | |
| 7,500,183 B2 | 3/2009 | Kelly | |
| 7,770,122 B1 | 8/2010 | Shaik | |
| 8,010,628 B2 * | 8/2011 | Finlaw | G06Q 10/025 709/217 |
| 8,037,168 B2 | 10/2011 | Schneider | |
| 8,356,090 B2 | 1/2013 | Parsons et al. | |
| 8,560,665 B2 | 10/2013 | Parsons et al. | |
| 2002/0152286 A1 | 10/2002 | Peddu et al. | |
| 2003/0172145 A1 | 9/2003 | Nguyen | |
| 2004/0059793 A1 | 3/2004 | Gruber et al. | |
| 2004/0139170 A1 | 7/2004 | Shen et al. | |

(Continued)

OTHER PUBLICATIONS

Microsoft Computer Dictionary, 5th Edition, 2002, p. 383.
Margaret Rouse (Crawler, TechTarget: SearchSOA, Apr. 5, 2005). http://searchsoa.techtarget.com/definition/crawler.

*Primary Examiner* — William J Allen
(74) *Attorney, Agent, or Firm* — Quarles & Brady LLP

(57) ABSTRACT

Systems and methods of the present invention provide for one or more server computers communicatively coupled to a network and configured to: receive a request for a product or service; determine a geographic region associated with the request; search a first data regarding websites available only to the hosting provider as host of the websites and a second data regarding websites available to the public via the Internet; determine, based on the first data and the second data, which of the websites are most relevant to the request; and return an information about one or more of the websites responsive to the request, wherein each of the websites has a physical location within the geographic region.

13 Claims, 4 Drawing Sheets

(56) References Cited

U.S. PATENT DOCUMENTS

| | | |
|---|---|---|
| 2005/0147950 A1 | 7/2005 | Ortiz et al. |
| 2005/0216289 A1 | 9/2005 | Parsons et al. |
| 2006/0168127 A1 | 7/2006 | Kelly |
| 2007/0168465 A1 | 7/2007 | Toppenberg et al. |
| 2008/0059607 A1 | 3/2008 | Schneider |
| 2008/0126170 A1 | 5/2008 | Leck et al. |
| 2008/0270486 A1 | 10/2008 | Hind et al. |
| 2009/0094137 A1 | 4/2009 | Toppenberg et al. |
| 2009/0106197 A1* | 4/2009 | Bennett, III ........... G06Q 30/02 |
| 2009/0216577 A1 | 8/2009 | Killebrew |
| 2010/0169340 A1* | 7/2010 | Kenedy .............. G06Q 30/0631 707/758 |
| 2010/0318558 A1 | 12/2010 | Boothroyd |
| 2011/0040642 A1* | 2/2011 | O'Dell .............. G06F 17/30241 705/26.1 |
| 2012/0042010 A1 | 2/2012 | Rosenfield et al. |
| 2012/0072548 A1 | 3/2012 | Kim |
| 2012/0197757 A1* | 8/2012 | Ajala ..................... G06Q 30/02 705/26.9 |
| 2013/0031466 A1 | 1/2013 | Curran et al. |
| 2013/0067319 A1 | 3/2013 | Olszewski et al. |
| 2013/0103803 A1 | 4/2013 | Parsons et al. |
| 2013/0246381 A1* | 9/2013 | Garg ................... G06F 17/3087 707/706 |
| 2014/0149240 A1 | 5/2014 | Ansel et al. |
| 2014/0149845 A1 | 5/2014 | Ansel et al. |
| 2014/0149846 A1 | 5/2014 | Ansel et al. |
| 2014/0188665 A1* | 7/2014 | Baker ................ G06Q 30/0625 705/26.62 |
| 2015/0278828 A1* | 10/2015 | Marcus ............. G06Q 30/0201 705/7.29 |
| 2015/0317697 A1* | 11/2015 | Samet ................ G06Q 30/0275 705/14.43 |

* cited by examiner

Admin Account Control Panel – Browser

Admin Account Control Panel for My Business – mybusiness.com

Admin Account Data: Edit    Business Website: mybusiness.com    Configure

Physical Address: 123 Main St., Scottsdale AZ, 12345

Store Hours: 8A-5P; M-F

Industry Vertical: Edit    Bike Sales/Repair ▽
Restaurant
Doctor's Office

Social Media/ API: Edit    Yelp ▽    Username: Social1
Facebook        Password: **********
Twitter Synchronize information on this form with the social networking API, or view the API separately.

Product Information: Manage Products

Name: Product 1    In Stock: 5    Price: $ 19.99    Returns: Yes – 30 Days

Related Products: Product 2 ▽    Warranty: 90 Days    Configure Sales
Product 3
Product 4

FIG. 4

LOCAL MERCHANT RECOMMENDATION ENGINE

FIELD OF THE INVENTION

The present invention generally relates to the field of Internet searching and specifically to the field of searching for an available product or service from a local merchant based on a first data available exclusively to a hosting provider and a second data available to the public via the Internet.

SUMMARY OF THE INVENTION

The present inventions provide methods and systems comprising one or more server computers communicatively coupled to a network and operated by a hosting provider hosting a plurality of business websites. One or more software modules running on the server(s) may be configured to: receive a request for a product or service; determine a geographic region associated with the request; search a first plurality of data regarding the plurality of business websites available only to the hosting provider as host of the plurality of business websites; search a second plurality of data regarding the plurality of business websites available to the public via the Internet; determine, based on the first plurality of data and the second plurality of data, which of the at least one of the plurality of business websites are most relevant to the request; and return an information about one or more of the business websites responsive to the request, wherein each of the business websites has a physical location within the geographic region.

The above features and advantages of the present invention will be better understood from the following detailed description taken in conjunction with the accompanying drawings.

BRIEF DESCRIPTION OF THE DRAWINGS

FIG. 4 illustrates a non-limiting example interface used to recommend products and services from a local merchant.

DETAILED DESCRIPTION

Figure 1:
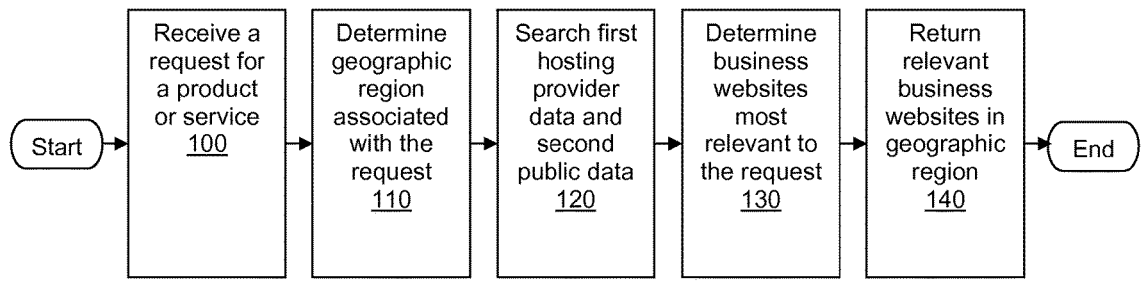
FIG. 1 is a flow diagram illustrating a possible embodiment of a method for recommending products and services from a local merchant.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Merchants may use business websites to describe, advertise and/or sell the products or services they offer, possibly in a physical "brick and mortar" store. The Internet presents potential customers with the unique opportunity to search the business websites for merchants' products and services in order to determine if they match the potential customers' needs. In addition, in instances where customers prefer to travel to local physical stores to see the products and/or demonstrations of the products/services in person, the Internet may be used to access local merchants' business websites to determine the physical location of these stores and store hours.

Applicant has determined, however, that presently existing methods and systems for searching the Internet for local products and services provide no means to access data uniquely available to the hosting provider of the merchants' business websites. This data, which may not be available to the general public in an easily-accessible format could, if employed appropriate, greatly improve and enhance the search for local products and services that may benefit both consumers and merchants. Furthermore, presently existing systems and methods do not provide for a local merchant recommendation algorithm that provides smarter search results by factoring and combining this unique data with social sentiment, reputation data, etc. available via the Internet.

Applicant has therefore determined that optimal systems and methods may improve on presently-existing systems and methods by providing means to access data uniquely available to the hosting provider of the merchants' business websites, as well as providing for a local merchant recommendation algorithm that provides smarter search results by factoring and combining this unique data with social sentiment, reputation data, etc. available via the Internet.

Several different methods may be used to provide and manage the disclosed invention. In the example embodiment shown in FIG. 1, one or more server computers may be communicatively coupled to a network, and may be operated by a hosting provider hosting a plurality of business websites. The server(s) may be configured to: receive a request for a product or service (Step 100); determine a geographic region associated with the request (Step 110); search: i) a first data regarding business websites available only to the hosting provider as host of the business websites; and ii) a second data regarding business websites available to the public via the Internet (Step 120); determine, based on the first data and the second data, which of the business websites are most relevant to the request (Step 130); and return information about the business websites in response to the request, wherein the business websites have a physical location within the geographic region (step 140).

Figure 2:
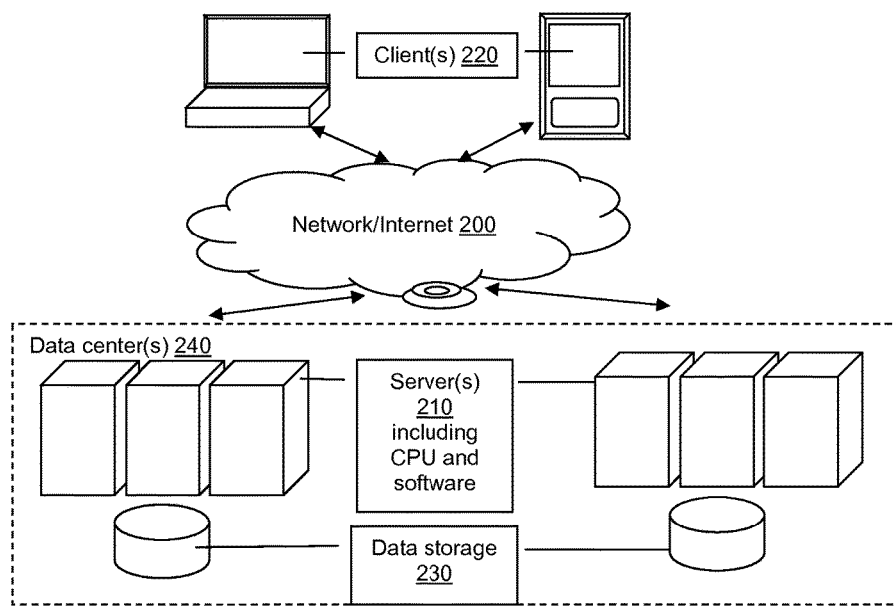
FIG. 2 illustrates a possible system for recommending products and services from a local merchant.

Several different environments may be used to accomplish the method steps of embodiments disclosed herein. FIG. 2 demonstrates a streamlined example and FIG. 3 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules/components) in computer-readable media accessible to the CPU, such as a hard disk drive on a server 210 and/or client 220.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 220.

The server 210 may exist within a server cluster, as illustrated. These clusters may include a group of tightly coupled computers that work together so that in many respects they can be viewed as though they are a single computer. The components may be connected to each other through fast local area networks, which may improve performance and/or availability over that provided by a single computer.

Figure 3:
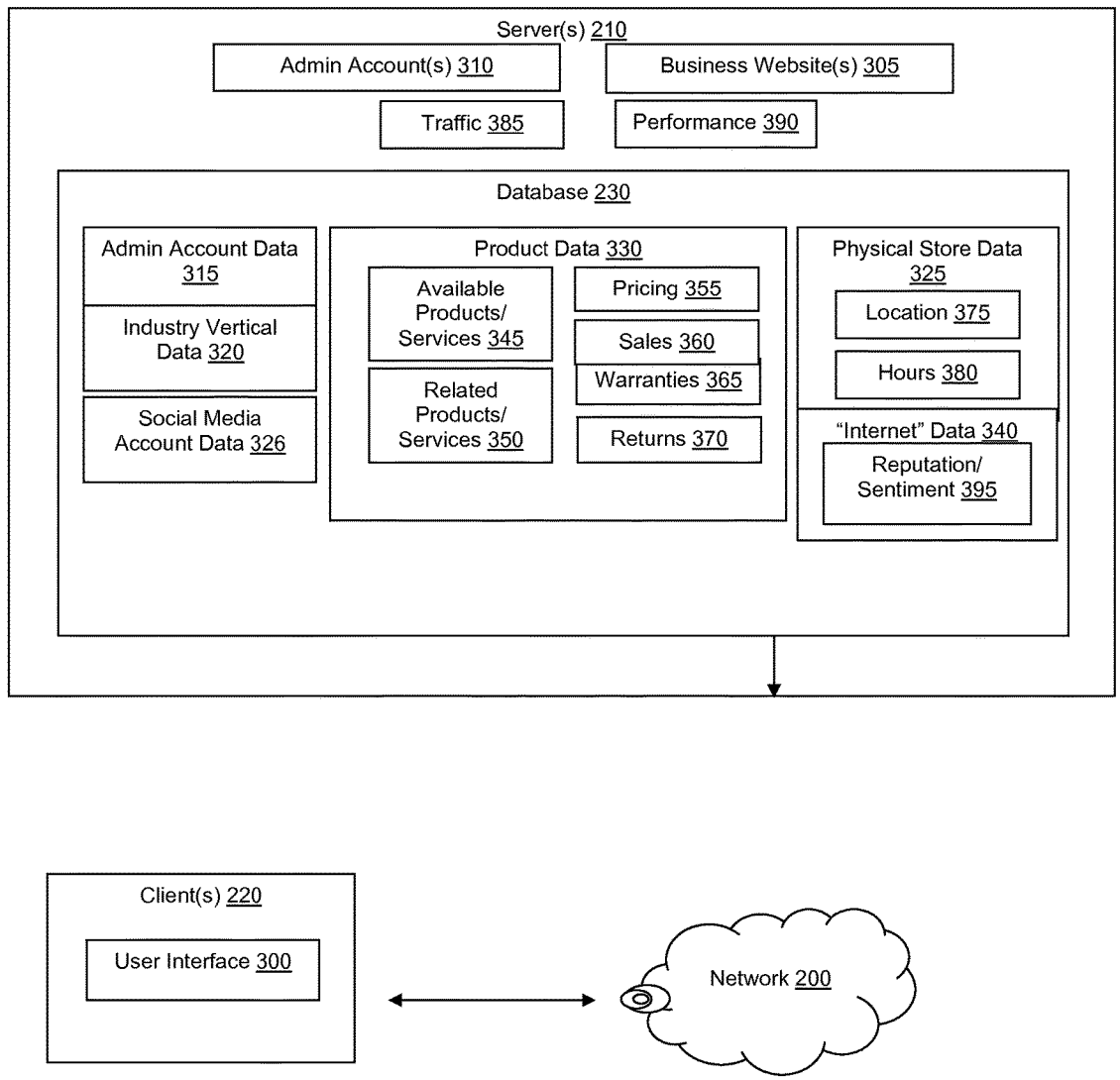
FIG. 3 illustrates a more detailed possible system for recommending products and services from a local merchant.

The environment(s) in FIGS. 2-3 may include one or more centralized software modules capable of connecting to any type of software within the environment. In some embodiments, this centralized software may comprise an Application Programming Interface (API) and any request to the API disclosed herein may comprise a Remote Procedure Call (RPC) to the API. An API may comprise a service made available to third parties, which may further comprise any individual, entity, system, hardware, or software wishing to access the disclosed information and functionality.

Such an API may comprise a software-to-software interface that specifies the protocol defining how independent computer programs interact or communicate with each other. It also may comprise a collection of pre-configured building blocks allowing a third party to easily configure their software for compatibility and/or extensibility. The API may allow a requesting party's software to communicate and interact with the software application and/or its provider—perhaps over a network—through a series of function calls (requests for services). It may comprise an interface provided by the software application and/or its provider to support function calls made of the software application by other computer programs.

The API may comprise any API type known in the art or developed in the future including, but not limited to, request-style, Berkeley Sockets, Transport Layer Interface (TLI), Representational State Transfer (REST), Simple Object Access Protocol (SOAP), RPCs, Standard Query Language (SQL), file transfer, message delivery, and/or any combination thereof. The API may comprise computer-readable code that, when executed, causes the API to receive an RPC (i.e., function call) requesting information services. Responsive to receipt of the RPC, the API may perform the above described processes, and transmit request results to the requesting third party.

To submit the request via an RPC to the API, the server(s) 210 may require authentication with the API. Computers or servers may locate the API via an access protected URL mapped to the API, and may then use an API key configured to authenticate the one or more computers or servers prior to accessing the API. Non limiting example programming environments for client applications may include JavaScript/AJAX (client side automation), ASP, JSP, Ruby on Rails, Python's Django, PHP, HTML pages or rich media like Flash, Flex or Silverlight.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220.

The client(s) 220 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 may be communicatively coupled to data storage 230 including any information requested or required by the system and/or described herein. The data storage 230 may be any computer components, devices, and/or recording media that may retain digital data used for computing for some interval of time. The storage may be capable of retaining stored content for any data required, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 210, and any reference to the server(s) 210 being configured to accomplish the disclosed method steps may include the software module(s)/component(s). As non-limiting examples of such software, the paragraphs below describe in detail the software modules/components that make up the software combination. These software modules/components may comprise software and/or scripts containing instructions that, when executed by a microprocessor on a server 210 or client 220, cause the microprocessor to accomplish the purpose of the module/component as described in detail herein. The software combination may also share information, including data from data sources and/or variables used in various algorithms executed on the servers 210 and/or clients 220 within the system, between each module/component of the software combination as needed.

A data center 240 may provide hosting services for the software combination, or any related hosted website including, but not limited to hosting one or more computers or servers in a data center 240 as well as providing the general infrastructure necessary to offer hosting services to Internet users including hardware, software, Internet web sites, hosting servers, and electronic communication means necessary to connect multiple computers and/or servers to the Internet or any other network 200.

FIG. 3 shows a more detailed example embodiment of an environment for accomplishing the systems and method steps disclosed herein. As non-limiting examples, all disclosed software modules may run on the server(s) 210 and may include one or more user interfaces 300 generated by the server(s) 210 and transmitted to and displayed on the client(s) 220. The user interface(s) 300 may be configured to receive input from the user and transmit this input to the server(s) 210 for the processing/administration of the input by the software module(s) and storage of the processed data in data storage 230 associated with the software module(s).

The server(s) 210 may be operated by a hosting provider hosting a plurality of websites 305. Each of the websites 305 may be managed and/or operated by an account and/or business website administrator ("admin"). As non-limiting examples, the admin may be a system administrator, software developer/database administrator for the hosting provider, a business owner, a website owner, a website developer for the website(s) 305, any other business or website administrator known in the art or any combination thereof.

The admin may create, publish and/or host one or more websites 305 and/or may set up any other hosting services provided by the hosting provider (e.g., domain names, email accounts, etc.). Software modules running on server(s) 210 may be configured to work in conjunction with the user interface 300 to transmit, receive, process and/or store any of the admin account 315, product 330, physical store 325, public Internet 340, industry vertical 320 and/or social media account 326 data disclosed herein.

The user interface 300 may include any format for generating and publishing websites known in the art. In some non-limiting example embodiments, the website may be generated using a WYSIWYG ("What You See Is What You Get") website design environment. As a non-limiting example, the administrator's hosting provider may run one or more software modules on server(s) 210, such as GODADDY's WEBSITE BUILDER, in order to create, publish and/or host one or more websites 305, enter information and/or content about the desired website 305 such as text, images, links, etc. and/or to set up any other hosting services. In some embodiments, the user may be presented with an "interview" style interface, similar to that seen in FIG. 4, allowing the admin to disclose any business website 305 and/or any product/service data 330 related to the admin account data 315 as disclosed herein.

In embodiments where the admin has already created the website and is only transferring a previously published website to be hosted with the hosting provider, the hosting provider may still capture the same admin account data 315 available via an interview-style user interface 300. To accomplish this, the server(s) 210 may be configured to crawl the content of the pre-existing business website 305 for keywords related to the unique collection of admin account data 315 captured via the interview format, and, using fuzzy logic, machine learning, crowd sourcing and/or any other type of "artificial intelligence," may determine the unique admin account data 315 based on the information captured from the website crawl.

Crawling (also known as "spidering") may comprise the process of visiting and analyzing one or more web pages (and/or social media accounts as described below) and reading the content to identify keywords within the content. The web crawler module may visit/read the selected web page(s), identify some or all keywords on each web page of each website 305, and generate a list of concepts, phrases and/or keywords related to the business' product or service. In some embodiments, this data may be stored in data storage 230. To accomplish this, data may then be "scraped" from the content of the website 305.

Data within data storage 230 may be organized according to any data structure known in the art, and may be associated with any other stored and structured data. As a non-limiting example, the disclosed system may be configured to create one or more data tables within data storage 230 for a grouping of data, such as the data described herein. Each of these data tables may contain one or more data records and each of the data records may comprise one or more data fields, including a unique identifier for the record and additional details about the record.

A non-limiting example may include data fields within a data record associated with a business account and/or website account ("admin account") 310. Each admin account 310 may be populated with additional admin account data 315, such as a unique identifier ("user ID," "business ID," etc.), and details about the account, such as a business name, username, password, first name, last name, physical address, email address, phone number, industry vertical data 320, social media account data 326, physical store data 325, product data 330, etc.

The server(s) 210 may be configured to work in conjunction with data storage 230 to store data. As non-limiting examples, the previously described user interface(s) 300 may receive input, which may then be stored in data storage 230 as the admin account data 315. In some embodiments, the data received from the admin may be data available exclusively to the hosting provider as host of the business website(s) 305.

The server(s) 210 may be configured to receive a request for a product or a service (Step 100). The request may comprise a request for: a desired number of query results; a desired maximum distance between the geographic region and a product or service location; a brand name or a product type for the product or service; one or more products or services related to the product or service; a desired price range for the product or service; an availability of the product or service; a warranty information about the product or service; a return policy information about the product or service; and/or a desired reputation for the product or service;

In some embodiments, the request may be received via a user interface generated by server(s) 210 and comprising a search box displayed on a website 305. As a non-limiting example, the search box may be displayed on the front of site of the hosting provider's website. In some embodiments, the user interface 300 may include means for the user to select and specify parameters to narrow the search, possibly using a series of user interface elements (e.g., checkboxes, drop-downs, text boxes, etc.) including parameters to search data for a business website(s) 305, product 330, physical store 325, public Internet 340, industry vertical 320, social media account 326, traffic 385 and/or performance 390 associated with one or more admin accounts 310 hosted by the hosting provider.

As non-limiting examples, the user may narrow the search to include a first data available only to the hosting provider including: a more specific definition of "local" merchants by specifying search parameters that includes products, services and/or businesses within a specific proximity/radius from the searching device (e.g., within 10 miles); a more specific detail about the product, service and/or business (e.g., a search for Trek bikes presents the user with a drop down for selecting between road bikes and mountain bikes); a preferred "time slot" available to the user to pick up the product or receive the service to be matched with, for example, posted store hours for a business; a desired price range to be matched with posted product pricing; a user's preferred breadth of warranty (full product, parts, service available, etc.) and warranty length to be matched with posted/stored warranty information; a user's preferred return policy parameters (e.g., length of time the product may be returned, is shipping paid, etc.) to be matched with a posted/stored return policies, etc.

The user may also broaden the search to include a second data not exclusively available to the hosting provider, including, as non-limiting examples, social sentiment feedback data or general data on the Internet about the business, business website(s) 305, products and/or services associated with one or more admin accounts 310.

The request for the product(s) and/or service(s) may be received and processed by server(s) 210. As non-limiting examples, the search may be received via the previously described user interface 300, or may be received via an API hosted and running on server(s) 210 and made available to one or more search engines. Users may enter a specific search for a specific product and/or service, and the RPC to the API may be triggered when certain concepts are identified within the search.

The search may be submitted or transmitted to the API running on the server(s) 210, which may be configured to receive the search and analyze the content of the search to determine the products and/or services requested. The server(s) 210 may then be configured to analyze the search received to determine specific parameters of the search, such as those described for interface-based searches, above. The server(s) 210 may then be configured to search for the requested information, as described herein.

The server(s) 210 may be configured to determine a geographic region associated with the request (Step 110). The geographic region may comprise a geographic region received with or determined from the request submitted. Where the non-limiting example user interface is utilized as described above, the user may enter their current location as part of the request for desired proximity/radius from the searching device.

The geographic region may also comprise a geographic region determined from a search origin location. The server(s) 210 may be configured to determine the location of the searching device. Any means of determining a search origin location may be utilized to determine this geographic region.

As a non-limiting example, GPS software on the device may identify the geographic region associated with a search origin location. In embodiments using GPS technology, geo location software may be used comprising any software/hardware combination that provides reliable location and time information in various weather conditions and at various times on or near the Earth, using a receiver which calculates the user's position by precisely timing the signals sent. As a non-limiting example, a GPS system may be used as the geo-location software. The GPS may use a global navigation satellite system (GNSS) to provide location and time information where there is an unobstructed line of site for 4 GPS satellites. The GPS receiver on the client computer/mobile device may calculate its position by timing the signals sent by the satellites. Each satellite may continually transmit a message that includes the time the message was transmitted. The receiver may then use the message it receives to determine the transit time of each message and compute the distance to each satellite. These distances along with the satellites' locations may be used with the possible aid of trilateration, depending on which algorithm is used, to compute the position of the receiver. This position may then be displayed, perhaps with a moving map display or latitude and longitude; elevation information may be included. Many GPS units show derived information such as direction and speed, calculated from position changes.

As another non-limiting example, the IP address associated with the device (e.g., IP address on a network, the IP address of the incoming request/search, etc.) may identify the geographic region associated with a search origin location. In embodiments that determine the search engine location based upon an IP address of the client device 220 on the network. This IP address may then be mapped to a real-world geographic location by requesting, from a library mapping at least one IP address to at least one geographic location, the location of the client device 220 based upon the IP address.

This may be accomplished using one or more available geo location databases (e.g., Ip2location, MaxMind, Tamo Soft, IPligence). Such geo location databases may get their contact, IP and/or registration information from WHOIS databases, which may be accurate down to zip code level. When an organization requires a block of IP addresses, a request may be submitted and allocated IP addresses may be assigned to a requested ISP. The server(s) 210 may then use this information to determine the location of the IP address.

The server(s) 210 may be configured to search a first data regarding websites 305 available only to the hosting provider as host of the plurality of websites 305 (Step 120). In some embodiments, this first data may comprise technical hosting data such as traffic data 385, performance data 390, domain names/DNS data, etc. associated with each of the websites 305.

The first data may also comprise data specific to the content of each of the websites 305 such as product data 330, which may comprise any data received and stored by an admin and/or requested by a customer about one or more products and/or services offered within the business website(s) 305 and/or the administrator's physical store.

Product and/or service data 330 may include, as non-limiting examples: an availability 345 of one or more product(s) and/or service(s), possibly including physical store data 325 such as location data 375 and/or hours data 380 for a physical store providing the product(s) and/or service(s); one or more additional products and/or services related to the product(s) and/or service(s) 350; pricing data 355 about the product(s) and/or service(s); sales data 360 about the product(s) and/or service(s); warranty data 365 about the product(s) and/or service(s); and/or return policy data 370 about the product(s) and/or service(s). Non-limiting examples of product and/or services data 330 may include general descriptions, brand names of products and/or services (e.g., TREK bicycles, bike repair, FENDER guitars, etc.), a total amount of product available in stock, frequency that the in-stock product is renewed for availability, description of labor for services, etc.

Related products or services data 350 may comprise one or more related products and/or services 350 available through the administrator's business website 305 and/or physical store. Related product/service data 350 may include, as non-limiting examples, general descriptions, the brand names of the product or service, total amount of product available in stock, frequency that this stock is renewed for availability, description of labor for services, etc.

Pricing data 355 associated with the product and/or service may include, for example, an hourly rate associated with labor. Product data 330 and/or pricing data 355 may further comprise sale pricing data 360. This sale pricing data 360 may include information on reduced pricing for products and/or services and/or may also include sales records of the products and/or services, providing the admin and/or potential customers with information to determine, as non-limiting examples, the volume of sales of a particular product, the demand for a particular service, etc.

Warranty data 365 associated with the product and/or service may include, as non-limiting examples, the coverage of the warranty (i.e., whether the entire product/service, or only portions of the product/service are covered by the warranty, and which portions).

Product returns data 370, may include, as non-limiting examples, whether the business accepts returns, the business' policies on returns, the time period in which the return must be made, etc.

Physical store data 325 may comprise any data necessary for a customer to access the products and/or services provided by the admin via a physical "brick and mortar" store in a physical location. Non-limiting examples of physical store data 325 may include a physical location data 375 for the store (e.g., a physical address) and/or store hours data 380, providing information about when the store is open for a potential customer, to determine if the store is within an acceptable distance from the customer, or whether the customer will be available to purchase the product or service during convenient hours.

FIG. 4 shows a non-limiting example user interface 300 configured to receive admin account data 315 related to an administrator's business, website(s) 305 and/or products/services 330. As the host of the business website(s) 305 and/or other hosting services, the hosting provider may have unique insights into data provided exclusively to the hosting provider by the admin. In the "interview style" data capture interface illustrated in FIG. 4, the hosting provider may capture specific data available exclusively to the hosting provider. This specific data capture may then be structured in data storage 230 according to a specific and unique collection of data.

The hosting provider may also have unique insights into information from business website(s) 305 of two or more administrators hosting their business website 305 with the hosting provider, thereby creating a "synergy" between the two admin accounts. As a non-limiting example, information available exclusively to the hosting provider, such as keywords associated with website content may create a platform available exclusively to administrators that are hosting provider customers for finding other hosting provider administrators that are a match, and/or "cross selling" available products to other administrators, etc.

FIG. 4 further demonstrates unique industry vertical data 320 associated with the administrator's business, such as a bike sales/repair shop, restaurant, doctor's office, etc. that may be exclusively available to the hosting provider. As non-limiting examples, this industry vertical data 320 may be used to 1) limit search results and identify a specific product or service; and/or 2) determine other administrators hosting business websites 305 with the hosting provider, which may then "cross sell" products and services, info that's exclusively available to the hosting provider, as described above.

Figure 5:
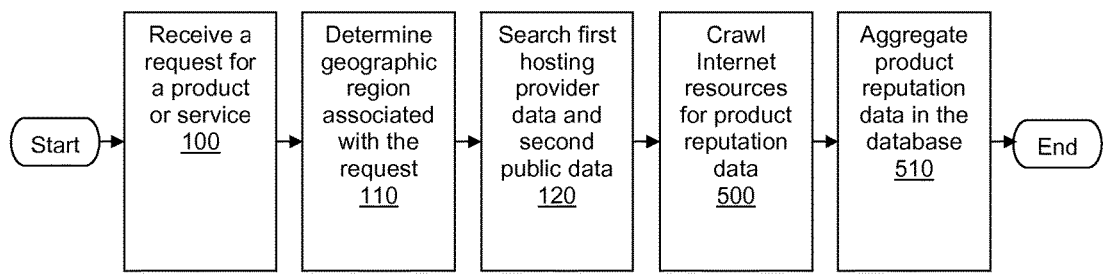
FIG. 5 is a flow diagram illustrating a possible embodiment of a method for recommending products and services from a local merchant.

The server(s) 210 may be configured to search a second data regarding websites 305 available to the public via the Internet (Step 120). The second data may comprise a plurality of reputation, social sentiment and/or ratings data 395 about the product(s) and/or service(s). To make this reputation, social sentiment data and/or ratings data 395 available for searches, as seen in FIG. 5, the server(s) 210 may be configured to: crawl one or more Internet resources for reputation, social sentiment and/or ratings data 395 related to the product and/or service (Step 500); and aggregate, within the database, the reputation, social sentiment and/or ratings data 395 (Step 510).

The one or more Internet resources may include: a content search of at least one Internet web page; and/or a content within at least one social media account associated, in data storage 230, with one or more admin accounts, such as the social media account data 326 collected in the example embodiment in FIG. 4. "Public Internet" data 340 and/or social media account data 315 may comprise any data necessary for an admin and/or a customer to determine general business information and/or perceived reputation, social sentiment and/or ratings related to the products and/or services associated with admin accounts 310, business websites 305 and/or physical stores. This data may be received by crawling (as previously described) and searching for specific concepts, phrases and/or keywords related to a product and/or service associated with each individual admin account 310.

The social media account associated with the social media account data 335 may comprise a social media account outlet for a business or a social media outlet for a customer. As non-limiting examples, social media account data 335 may comprise a social media type (e.g., FACEBOOK, TWITTER, YELP, etc.), authentication information allowing the user to access one or more social media accounts (e.g., username, password), API access information for each social media account (e.g., a URL for the API, API documentation links, password information for accessing the API, etc.).

The data collected from the social website(s) and Internet crawl(s) may be received by the server(s) 210 and stored in data storage 230. This augmented information may be used to both add to a corpus of information about the business, as well as "fill in" any data that was inaccessible or not provided during the user interview or during a crawl of a "non-interview" hosted website 305. The stored information may then be associated, in data storage 230, with the at least one admin account. The server(s) 210 may then aggregate the plurality of reputation or social sentiment data associated with the admin account.

As a non-limiting example, the server(s) 210 may be configured to scan, crawl, access and/or otherwise analyze the website in association with the Better Business Bureau ("BBB") to determine a reputation of a specific business, and may generate a "reputation score" based on the information received from the BBB.

The server(s) 210 may be configured to determine the business websites most relevant to the request (Step 130) by ranking the website(s) 305 according to the accuracy of a relevance to the request. The accuracy of the search results may be determined by a correlation between a number of search elements in the search and a number of corresponding product(s) and/or service(s) data elements associated with the website 305 and found in the search result.

Specifically, the server(s) 210 may be configured to match search criteria (including any search criteria determined from the user interface 300 shown in FIG. 4 and/or any other search criteria for products and/or services known in the art) for the first plurality of data to a first plurality of data stored in data storage 230.

The server(s) 210 may be configured to return relevant business websites in a geographic region (Step 140). Information about the business website(s) 305 may comprise, as non-limiting examples, a link, a contact information, a map location and/or a phone number.

The steps included in the embodiments illustrated and described in relation to the figures are not limited to the embodiment shown in the figures and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
    receiving, by a server hardware computing device communicatively coupled to a network and comprising at least one processor executing specific computer-executable instructions within a memory: a first transmission comprising an entity data, input using a first graphical user interface (GUI) displayed on a first client hardware computing device operated by a first user administrating a website, the entity data comprising:
        a unique entity identifier for an entity associated with the website;
        a physical geographic entity location data; and
        a uniform resource location (URL) used to access the website, or used to access an application programming interface (API) for a social media account associated with the entity;

executing, by the server hardware computing device:
  a data extraction of at least one sentiment or reputation keyword, associated with the entity, from a crawl of the website or the social media account; and
  a first database command aggregating, into a database coupled to the network and utilized in conjunction with the server hardware computing device, the entity data and the at least one sentiment or reputation keyword in association within the entity data;
receiving, by the server hardware computing device, a second transmission comprising at least one parameter for an entity data request including:
  a character string comprising at least one keyword; and
  a physical geographic location of a second client hardware computing device operated by a requester originating the request;
selecting, by the server hardware computing device, from the database:
  a first entity data available only to a hosting provider as host of the website and including:
    a keyword data matching the at least one keyword; and
    the physical geographic entity location data matching the physical geographic location of the second client hardware computing device; and
  a second entity data available to the public via the Internet and including the at least one sentiment or reputation keyword;
returning, by the server hardware computing device, and responsive to the request:
  an entity website content data comprising the first entity data and the second entity data; and
  a plurality of business websites, including the website, having a physical location within the geographic region;
ordering, by the server hardware computing device, the plurality of business websites according to a positive sentiment or a negative sentiment associated with the at least one sentiment or reputation keyword; and
transmitting, by the server hardware computing device, the entity website content data and the plurality of websites to the second client hardware computing device for display on a second GUI displayed on the second client hardware computing device.

2. The method of claim 1, wherein the second transmission comprises a user input including:
  a desired number of query results;
  a desired maximum distance between the physical geographic location and the physical geographic entity location data;
  a brand name or a product type for a product or service available from the entity;
  a request for at least one product or service related to the product or service;
  a desired price range for the product or service;
  a request for an availability of the product or service;
  a request for a warranty information about the product or service;
  a request for a return policy information about the product or service; or
  a desired reputation for the product or service.

3. The method of claim 1, wherein the physical geographic location comprises:
  a geographic location received with or determined from the second transmission; or
  a search origin location.

4. The method of claim 1, wherein the entity data further includes:
  a product or service and a related product or service;
  a price of the product or service;
  an availability for the product or service;
  a warranty information about the product or service; or
  a return policy information about the product or service.

5. The method of claim 4, wherein a positive sentiment or a negative sentiment associated with the at least one sentiment or reputation keyword comprises a plurality of reputation or social sentiment data about the product or service.

6. The method of claim 4, further comprising:
  crawling, by the server hardware computing device, at least one Internet resource for a plurality of reputation or social sentiment data related to the product or service, the at least one Internet resource comprising:
    a content search of at least one Internet web page; or
    a content within the social media account; and
  aggregating, by the server hardware computing device the plurality of reputation or social sentiment data.

7. The method of claim 1, wherein a second database command selects the entity data according to a correlation between a number of search elements in the entity data request and a number of corresponding data elements associated with the selected entity data.

8. The method of claim 1, wherein the second GUI comprises a link, a contact information, a map location, or a phone number.

9. A system, comprising a server hardware computing device communicatively coupled to a network and comprising at least one processor executing specific computer-executable instructions within a memory, that, when executed, cause the system to:
  receive a first transmission comprising an entity data input using a first graphical user interface (GUI) displayed on a first client hardware computing device operated by a first user administrating a website, the entity data comprising:
    a unique entity identifier for an entity associated with the website;
    a physical geographic entity location data;
    a uniform resource location (URL) used to access the website, or used to access an application programming interface (API) for a social media account associated with the entity;
  execute:
    a data extraction of at least one sentiment or reputation keyword, associated with the entity, from a crawl of the website or the social media account; and
    a first database command aggregating, into a database coupled to the network and utilized in conjunction with the server hardware computing device, the entity data and the at least one sentiment or reputation keyword in association within the entity data;
  receive a second transmission comprising at least one parameter for an entity data request including:
    a character string comprising at least one keyword; and
    a physical geographic location of a second client hardware computing device operated by a requester originating the request;

select, from the database:
: a first entity data available only to a hosting provider as host of the website and including:
: : a keyword data matching the at least one keyword; and
: : the physical geographic entity location data matching the physical geographic location of the second client hardware computing device; and
: a second entity data available to the public via the Internet and including the at least one sentiment or reputation keyword;
return responsive to the request:
: an entity website content data comprising the first entity data and the second entity data; and
: a plurality of business websites, including the website, having a physical location within the geographic region;
order the plurality of business websites according to a positive sentiment or a negative sentiment associated with the at least one sentiment or reputation keyword; and
transmit the entity website content data and the plurality of websites to the second client hardware computing device for display on a second GUI displayed on the second client hardware computing device.

10. The system of claim 9, wherein the second transmission comprises a user input including:
: a desired number of query results;
: a desired maximum distance between the physical geographic location and the physical geographic entity location data;
: a brand name or a product type for a product or service available from the entity;
: a request for at least one product or service related to the product or service;
: a desired price range for the product or service;
: a request for an availability of the product or service;
: a request for a warranty information about the product or service;
: a request for a return policy information about the product or service; or
: a desired reputation for the product or service.

11. The system of claim 9, wherein the entity data further includes:
: a product or service and a related product or service;
: a price of the product or service;
: an availability for the product or service;
: a warranty information about the product or service; or
: a return policy information about the product or service.

12. The system of claim 11, wherein a positive sentiment or a negative sentiment associated with the at least one sentiment or reputation keyword comprises a plurality of reputation or social sentiment data about the product or service.

13. The system of claim 9, wherein the second GUI comprises a link, a contact information, a map location, or a phone number.

* * * * *